United States Patent [19]

Wooden et al.

[11] Patent Number: 5,660,776
[45] Date of Patent: Aug. 26, 1997

[54] PROCESS OF MAKING STYRENIC POLYMER PELLETS

[75] Inventors: David Wooden, Boxborough; Steven Krupinski, West Boylston, both of Mass.

[73] Assignee: Novacor Chemicals (International) S.A., Villars-sur-Glâne, Switzerland

[21] Appl. No.: 559,835

[22] Filed: Nov. 20, 1995

[51] Int. Cl.[6] .................. B29B 9/06; B29C 47/00; C08F 12/08
[52] U.S. Cl. .............. 264/143; 159/2.2; 526/218.1; 526/219.6; 526/227; 526/230; 526/230.5; 526/232; 526/232.1; 526/313; 526/346; 526/347; 528/501
[58] Field of Search ..................... 264/101, 143; 159/2.2; 526/218.1, 219.6, 227, 230, 230.5, 232, 232.1, 313, 346, 347; 528/501

[56] References Cited

U.S. PATENT DOCUMENTS

| | | | |
|---|---|---|---|
| 3,089,194 | 5/1963 | Goins | 264/143 |
| 3,664,977 | 5/1972 | Nakanishi et al. | 525/132 |
| 4,125,695 | 11/1978 | Kamath | 526/73 |
| 4,782,098 | 11/1988 | Allen et al. | 521/81 |
| 4,874,796 | 10/1989 | Allen et al. | 521/59 |
| 4,920,153 | 4/1990 | Allen et al. | 521/60 |
| 5,008,298 | 4/1991 | Allen et al. | 521/139 |
| 5,093,374 | 3/1992 | Hahn et al. | 521/59 |
| 5,093,375 | 3/1992 | Hahn et al. | 521/59 |

FOREIGN PATENT DOCUMENTS 5-310864  4/1992  Japan.

OTHER PUBLICATIONS

Kamath, V., "New initiators for PS offer big efficiencies", Modern Plastics, Sep. 1981, pp. 106, 108, & 110.

*Primary Examiner*—Leo B. Tentoni
*Attorney, Agent, or Firm*—Kenneth H. Johnson

[57] ABSTRACT

A true solution of up to about 15 weight % of polyphenylene ether (PPO) in a styrenic polymer may be prepared by dissolving the PPO in one or more of the monomers polymerized to form the styrenic polymer and polymerizing the resulting solution in the presence of a free radical initiator. The resulting polymer has a higher Tg than crystal polystyrene and is suitable for use in hot drink containers.

18 Claims, 2 Drawing Sheets

PROCESS OF MAKING STYRENIC POLYMER PELLETS

FIELD OF THE INVENTION

The present invention relates to a solution of polystyrene containing up to 15 weight % of one or more polyphenylene ethers (sometimes also called polyphenylene oxides). More particularly, the present invention relates to a polymerization process to directly produce such solutions.

BACKGROUND OF THE INVENTION

Polystyrene is useful in a number of applications including packaging and, in particular, food packaging. Further, polystyrene is also useful in a number of foam applications such as insulated foam drinking cups or containers for individual servings of prepared food (e.g. "clam shells"). Polystyrene has a glass transition of about that of boiling water (100° C.). In some restaurants, to try to keep hot drinks hot, such as coffee, the serving temperature approaches that of the glass transition temperature of polystyrene. There is a need for a method for increasing the glass transition temperature of polystyrene.

The glass transition temperature of polystyrene may be increased by physical blending with a polymer having a higher glass transition temperature. However, it is expensive to pass material through an extruder to try to obtain a "true solution" of such a high glass transition temperature polymer in polystyrene (i.e. a material which exhibits only one glass transition temperature).

It is also possible to copolymerize styrene with a co-monomer which will result in a polymer having an increase in the glass transition temperature over that of polystyrene. One such polymer is maleic anhydride. However, Maleic anhydride has a high melting temperature and it is difficult to get it into and keep it in a melt of styrene/polystyrene. If it does precipitate before it forms a copolymer, it can necessitate the cleaning of a reactor resulting in losses due to down-time.

There are a number of patents assigned to General Electric, Company relating to a process for producing foamable beads to make a foam having a good resistance to heat. However, these references disclose a suspension process. The monomers are suspended in water at some stage during polymerization. This results in the incorporation of surfactants into the resulting polymer and a requirement to treat the water (continuous phase) in the emulsion process prior to discharge. Representative of such art are U.S. Pat. Nos. 4,782,098; 4,874,796; 4,920,153; and 5,008,298.

A similar approach has been taken by BASF as illustrated by U.S. Pat. Nos. 5,093,374 and 5,093,375.

World Patent Index abstract of JP 05310864 assigned to Mitsubishi Kasei Polytec Co. also takes the same approach.

All of the above art taken together strongly suggests that the trend in the industry to make the type of polymer in accordance with the object of the present invention is towards the use of a suspension process and not a bulk or solution polymerization process.

U.S. Pat. No. 3,664,977 teaches blending polyphenylene ether into the bulk polymerization of high impact polystyrene (HIPS) at a point after inversion of the solution of styrene in rubber (e.g. when the amount of polystyrene in the solution is about equal to the amount of rubber in the polystyrene) up to about 40% conversion. The reference does not teach blending polyphenylene oxide into the styrene monomer at the commencement of the polymerization. Again the reference teaches away from the process of the present invention.

ATOCHEM (formerly Pennwalt Corporation) is a supplier of a number of peroxide initiators to the polymer industry. Two references which describe the use of organic free radical initiators are the article "New initiators for PS offer big efficiencies" by V. Kamath, Modern Plastics, September 1981, pp. 106, 108, 110 and U.S. Pat. No. 4,125,695 both of which disclose the use of organic peroxide initiators to polymerize polystyrene. However, the references do not suggest the initiators could be used to form a true solution of polyphenylene ether in polystyrene.

The present invention seeks to provide a simple direct efficient process to produce a solution of polyphenylene ether in polystyrene.

SUMMARY OF THE INVENTION

The present invention provides a process to produce a solution of a styrene polymer containing up to 15 weight % of polyphenylene ether comprising:

a) dissolving a polyphenylene ether polymer in one or more of the monomers for said styrene polymer;

b) feeding the solution obtained in a) above together with up to 0.05 weight % of one or more organic free radical initiators and from 0 to 10 weight % of an organic diluent and additional monomer to produce a concentration polyphenylene ether in monomer of up to 15% to one or more reactors;

c) subjecting said solution to heat for a time sufficient to polymerize at least 70 weight % of the monomers;

d) subjecting said polymerized solution of styrenic polymer containing polyphenylene ether to temperature and pressure conditions to devolatilize unpolymerized monomer and diluent; and e) extruding said solution of styrenic polymer containing polyphenylene ether as strands and cooling said strands and chopping said strands into pellets.

DETAILED DESCRIPTION

Figure 1:
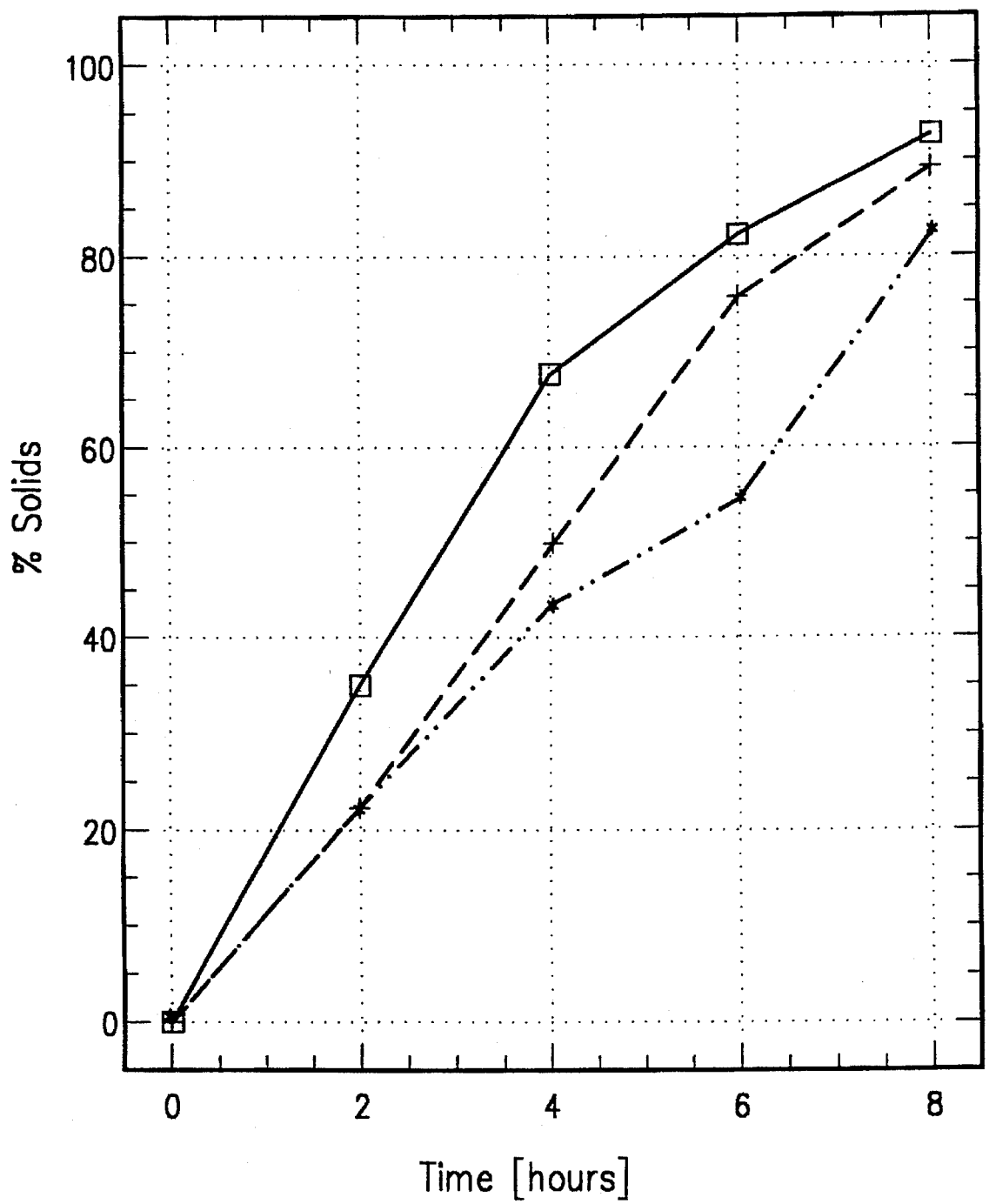
FIG. 1 is a graph showing the results of an experiment comparing the conversion at various times of styrene and styrene containing 5 and 10 wt. % of PPO batch polymerized in the presence of an organic free radical initiator.

The styrene polymer in accordance with the present invention may comprise from 100 to 70 weight % of one or more $C_{8-10}$ vinyl aromatic monomers which are unsubstituted or substituted in the alpha position or on the aromatic ring by one or more $C_{1-4}$ alkyl radicals and from 0 to 30 weight % of one or more comonomers. Suitable vinyl aromatic monomers include styrene, p-methyl styrene, alpha methyl styrene, and t-butyl styrene, preferably styrene. Suitable comonomers include $C_{1-4}$ alkyl esters of acrylic and methacrylic acid such as methyl methacrylate, ethyl methacrylate, methyl acrylate, ethyl acrylate and butyl acrylate. The comonomer may be used in amounts up to 30 weight %, preferably less than about 25 weight %.

The polyphenylene ether may have the formula:

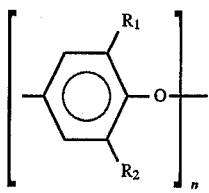

wherein $R_1$ and $R_2$ are independently selected from the group consisting of a hydrogen atom, a chlorine atom, $C_{1-4}$ alkyl radicals, $C_{1-4}$ alkoxy radicals, and a $C_{6-10}$ aromatic radical which is unsubstituted or substituted by a $C_{1-4}$ alkyl radical. Preferably, $R_1$ and $R_2$ are independently selected from the group consisting of a hydrogen atom, a chlorine atom, a methyl radical, a phenyl radical, a t-butyl radical, a methoxy radical, an m-tolyl radical, and a p-tolyl radical; most preferably a methyl radical. The polyphenylene ether may be used in amounts up to 15, preferably not more than 10, most preferably not more than 5 weight %.

In accordance with the present invention the polyphenylene ether is dissolved in one or more of the monomers polymerized to form the styrenic polymer, preferably styrene monomer. The monomers fed to the reactor may include a diluent to reduce the viscosity of the monomer feed. The diluent may be ethyl benzene. If present, the diluent is used in small amounts, typically less than 5 weight %.

The monomer feed containing the dissolved polyphenylene ether is then fed to the reactor together with an organic free radical initiator. The initiator may be used in amounts up to 0.05 weight % based on the total feed to the reactor.

Suitable organic free radical initiators include organic peroxides, organic peroxy ketals, and azo compounds. Useful azo free radical initiators include 2,2'-azo-bis-isobutyronitrile; and 2,2'-azo-bis-(2,4-dimethyl valeronitrile). Suitable organic peroxides include di-tert-butylperoxide; benzoyl peroxide; lauryl peroxide; oleyl peroxide; toluyl peroxide; di-tert-butyl diperphthalate; tert-butyl peracetate; tert-butyl perbenzoate; dicumyl peroxide; tert-butylperoxide isopropyl carbonate; 2,5-dimethyl-2,5-dimethyl-2,5 di-(tert-butylperoxy) hexane; 2,5-dimethyl-2,5-dimethyl-2,5 di-(tert-butylperoxy) hexane-3; cumene hydroperoxide; cyclopentane hydroperoxide; 2,5-dimethylhexane-2,5-dihydroperoxide; t-butyl hydroperoxide; and t-amyl hydroperoxide. Suitable peroxyketal initiators include n-butyl-4,4-bis(t-butylperoxy) valerate; 1,1-di(tert-butylperoxy)-3,3,5-trimethyl cyclohexane; 1,1-di(tert-butylperoxy)cyclohexane; 2,2-di(tert-butylperoxy)cyclohexane; 1,1-di(t-amylperoxy)cyclohexane; 2,2-di(t-butylperoxy)butane; ethyl-3,3-di(tert-butylperoxy)butyrate; ethyl-3,3-di(tert-amylperoxy)butyrate; tert-butyl peroctate; and mixtures thereof. Particularly useful free radical initiators include tert-butyl peracetate, 1,1-di(t-amylperoxy)cyclohexane; 1,1di-(tertbutylperoxy)cyclohexane; ethyl-3,3-di(tert-butylperoxy)butyrate; ethyl-3,3-di(tert-amylperoxy)butyrate; and tert-butyl peroctate. These free radical initiators may be used in amounts of 0.05 weight % or less, down to as low as 0.025, preferably from about 0.025 to 0.030 weight %.

The free radical initiators may be used alone or in combination. One may combine a low temperature and a high temperature initiator to give a higher molecular weight polystyrene together with a good rate of reaction. The initiator may comprise an initiator having two or more different types of initiators which decompose at different temperatures (i.e. difunctional initiators). However, one must bear in mind that free radical initiators can be dangerous and care should be used in mixing them. One should carefully review all safety data sheets from the manufacturer and conduct small experimental runs to ensure safety of the blend of initiators under the conditions of use.

The mixture of monomers for the styrenic polymer, polyphenylene ether and initiator is fed to one or more reactors and heated. The heat causes the initiator to decompose generating free radicals which polymerize the styrene. There are a number of different types of polymerization processes which are well known to those skilled in the art. The syrup of styrene monomer, polyphenylene ether and initiator is typically fed through one or more horizontal or vertical reactors at increasing temperature. Typically the temperatures range from about 100 to 200 preferably from about 110° to 180° C. The time to pass through the reactors will be a function of the reactor size. Typically the styrene polymer will have a molecular weight (weight average) Mw in the range of at least about 200,000, preferably greater than 250,000, most preferably greater than about 300,000. The polyphenylene ether does appear to reduce the rate of reaction and lower the molecular weight (Mw) somewhat but this can be overcome to some extent by the use of initiators and increasing the residence time in the reactors. The conversion of styrene monomer should be at least 70%, preferably greater than 75% on passing through the reactors.

On exiting the last reactor the syrup is then fed to a devolatilizer. The polymerized syrup is passed through a zone of low pressure to flash off unreacted monomer and diluent. The devolatilizer may be a falling strand devolatilizer in which the syrup is heated in a heat exchanger to temperatures from about 180 to 240, preferably from about 220° to 235° C., and then descends as strands through one or more vertical towers maintained at low pressure. Typically there is a pool of the polymer melt at the bottom of the devolatilizer. If desirable there may be distributors and/or trays within the reactor to increase the residence time. In some devolatilizers it is proposed to use twin screws at the bottom of the devolatilizer to turn over the pool of the syrup to further aid devolatilization. An alternative to the falling strand devolatilizer is the extruder (either single or twin screw, preferably twin screw) with vacuum ports along the barrel to draw off the unreacted monomer and diluent.

The devolatilized polymer is then extruded from the devolatilizer, typically using a high pressure gear pump, as strands. The strands are cooled typically by passing them through a water bath, and they are dried and then pelletized.

The present invention will now be illustrated by the following examples in which parts means parts by weight (typically grams); conversion of styrene monomer to polymer is measured in %, and the molecular weight is weight average molecular weight

EXAMPLE 1

Three series of polymerizations were conducted in 30 ml glass test tubes. In the first series 100% styrene monomer was polymerized. In series 2 and 3, about 5 and about 10 weight %, respectively of polyphenylene ether PPO (poly 2,6-dimethyl-1,4 phenylene ether) obtained from General Electric Company was dissolved in the styrene monomer. To the solution was added 0.028 weight % of 1,1-(di tert-amyl peroxy)cyclohexane.

There were a series of 6 test tubes for each experiment. The test tubes were placed in an oil bath which was programmed to be heated for the first three hours at 110° C., for the next three hours at 115° C. and for the last two hours at 150° C. At 2, 4, 6, and 8 hours a test tube was removed from the oil bath and a sample was devolatilized and the % conversion of the styrene was determined as well as the molecular weight (Mw).

Figure 2:
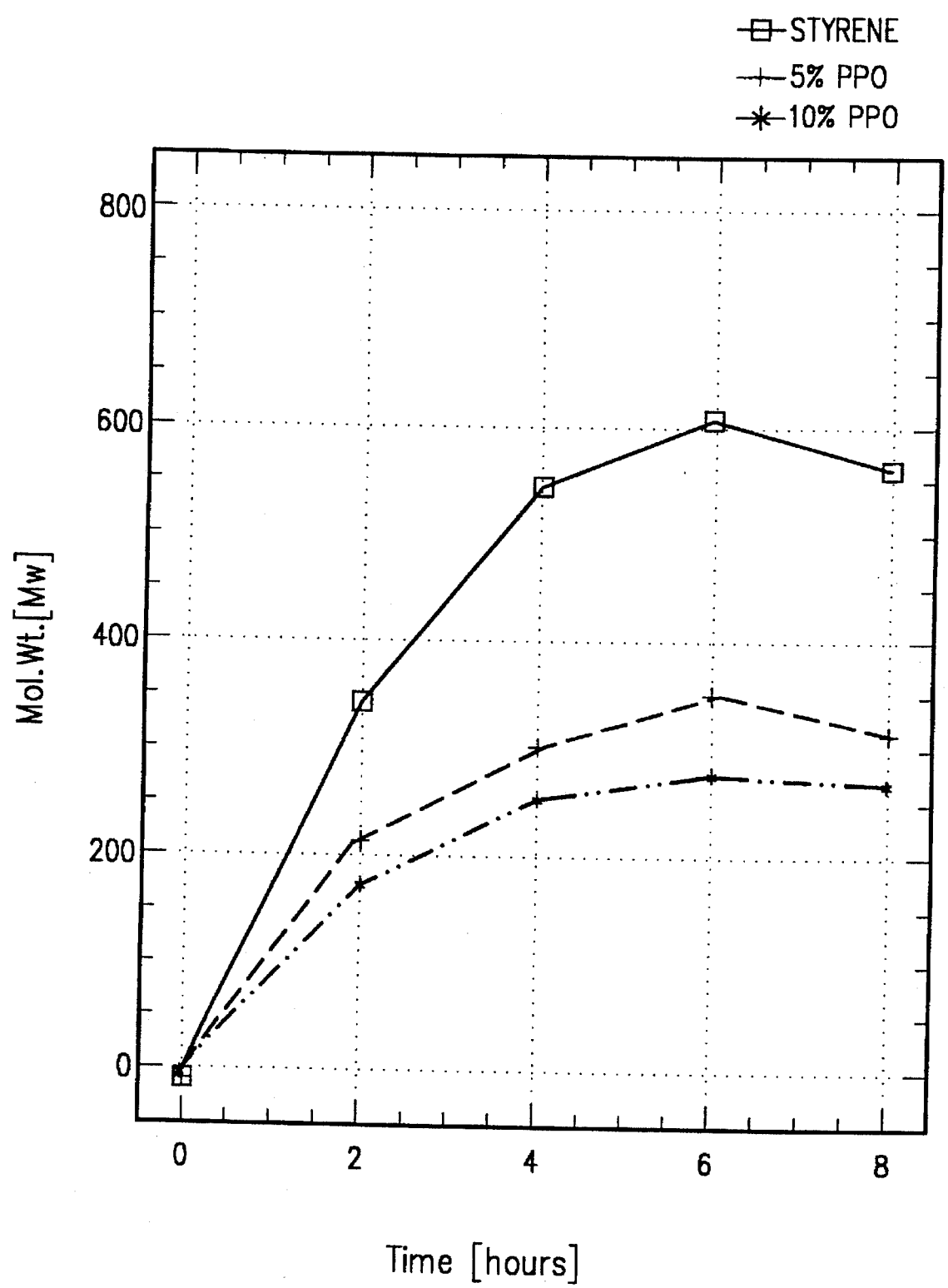
FIG. 2 is a graph showing the results of an experiment comparing the molecular weight [Mw] at various times of styrene and styrene containing 5 and 10 wt. % of PPO batch polymerized in the presence of an organic free radical initiator.

The results of the experiments are set forth in Table 1 and FIGS. 1 and 2.

TABLE 1

| Time | Styrene % conversion | Styrene Mw [×$10^{-3}$] | 5% PPO % conversion | 5% PPO Mw [×$10^{-3}$] | 10% PPO % conversion | 10% PPO Mw [×$10^{-3}$] |
|---|---|---|---|---|---|---|
| 0 | 0 | 0 | 0 | 0 | 0 | 0 |
| 2 | 34.7 | 335 | 22.1 | 210 | 22.7 | 167 |
| 4 | 67.6 | 544 | 49.5 | 300 | 43.7 | 245 |
| 6 | 81.3 | 608 | 75.7 | 355 | 54.5 | 283 |
| 8 | 92.0 | 558 | 89.5 | 313 | 81.9 | 255 |

The results of the above experiments were plotted as FIG. 1, for % solids and FIG. 2 for molecular weight.

The Tg of the polymers resulting from the above polymerizations were then determined. The results of these measurements are set forth in Table 2.

TABLE 2

|  | Polystyrene | Polystyrene and 5% PPO | Polystyrene and 10% PPO |
|---|---|---|---|
| Approximate PPO Content | 0 | 5.5% | 11.9 |
| Tg °C. | 106 | 116 | 122 |

The glass transition temperatures were single Tg's indicating a true solution of polyphenylene ether in polystyrene. Table 2 also demonstrates that the Tg of the resulting polymer is increased which indicates that the softening temperature of the polymer should also be increased.

EXAMPLE 2

Two continuous polymerizations were also performed using a continuous small scale line in order to produce polymer mixtures of polystyrene and PPO. A first reaction mixture was prepared by dissolving 5 parts by weight of PPO (poly 2,6-dimethyl-1,4 phenylene ether) in 95 parts by weight of styrene monomer containing 0.044 weight % of 1,1-(di tert amyl peroxy)cyclohexane. The feed solution was pumped at a rate of 1.73 lbs/hour into a first 2.1 liter CSTR reaction vessel maintained at 118° C. The feed was polymerized to about 41% solids (conversion) at equilibrium. The feed was then fed to a larger second CSTR maintained at 130°–144° C. in which the residence time was about 1.1 hours and the solids of the stream leaving the second reactor was 68%. The product from the second reactor was fed through a small tubular reactor maintained at 180° C. and then into a fallingstrand devolatilizer operated at about 235° C. and 7.7 mm of Hg (torr). The product was then extruded and pelletized. The estimated PPO content in the finished polymer based on the final conversion of 79% is about 6% by weight. The above procedure was repeated except that the feed consisted of 90 parts by weight of styrene monomer; 10 parts of PPO; and 0.44 weight % of 1,1-(di tert-amyl peroxy)cyclohexane. The reactors were operated at essentially the same conditions. Under these conditions the conversion in the first reactor was about 37% solids and the solids in the second reactor at equilibrium was about 62%. The estimated PPO content in the finished polymer based on the final conversion of 71% is about 14% by weight.

The products obtained from the runs were then molded into test specimens and a number of physical tests were conducted on the test specimens. The nature of the tests and the results are set forth in Table 3.

TABLE 3

|  | Run 1 | Run 2 |
|---|---|---|
| Melt Flow ASTM D 1238 [Cond. G] gm/10 min | 1.3 | 0.9 |
| IZOD ASTM D 256 ft./lbs | 0.40 | 0.40 |
| Tensile Strength ASTM D 638 |  |  |
| Yield Stress psi | 8600 | 9254 |
| Break Stress psi | 8470 | 9268 |
| Modulus Kpsi ASTM D 638 | 424 | 419 |
| Elongation % ASTM D 638 | 4.0 | 3.8 |
| Glass Transition Temperature (°C.) (DSC) | 115 | 121 |
| Vicat Softening Temperature (°C.) ASTM D 1525 | 114 | 121 |
| Molecular weight |  |  |
| Mw × $10^{-3}$ | 266 | 207 |
| Mn × $10^{-3}$ | 116 | 94 |
| Residual Styrene % | 0.15 | 0.21 |

The data in the above table demonstrates that the process of the present invention can be carried out in a continuous manner. The single Tg indicates the formation of a true solution (of PPO in polystyrene).

What is claimed is:

1. A process to produce a solution of styrenic polymer and pellets containing up to 15 weight % of polyphenylene ether comprising:

(a) dissolving a polyphenylene ether polymer in one or more of the monomers for said styrenic polymer;

(b) feeding the solution obtained in (a) above together with up to 0.05 weight % of one or more organic free radical initiators and from 0 to 10 weight % of an organic diluent and additional monomer to produce a concentration of polyphenylene ether in monomer of up to 15 weight % to one or more reactors;

(c) subjecting said solution to heat for a time sufficient to polymerize at least 70 weight % of the monomers;

(d) subjecting said polymerized solution of styrenic polymer containing polyphenylene ether to temperature and pressure conditions to devolatilize unpolymerized monomer and diluent; and (e) extruding said solution of styrene polymer containing polyphenylene ether as strands and cooling said strands and chopping said strands into pellets.

2. The process according to claim 1 wherein said styrenic polymer comprises from 100 to 70 weight % of styrene which is unsubstituted or substituted in the alpha position or on the aromatic ring by a $C_{1-4}$ alkyl radical and from 0 to 30 weight % of a $C_{1-4}$ alkyl ester of acrylic or methacrylic acid.

3. The process according to claim 2 wherein said polyphenylene ether is of the formula

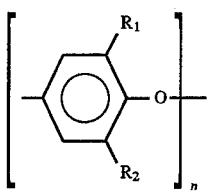

wherein $R_1$ and $R_2$ are independently selected from the group consisting of a hydrogen atom, a chlorine atom, $C_{1-4}$ alkyl radicals, $C_{1-4}$ alkoxy radicals, and $C_{6-10}$ aromatic radical which is unsubstituted or substituted by a $C_{1-4}$ alkyl radical.

4. The process according to claim 3, wherein $R_1$ and $R_2$ are independently selected from the group consisting of a hydrogen atom, a chlorine atom, a methyl radical, a phenyl radical, a t-butyl radical, a methoxy radical, an m-tolyl radical, and a p-tolyl radical.

5. The process according to claim 4, wherein the concentration of polyphenylene ether is up to 10 weight %.

6. The process according to claim 5, wherein the temperature in step (c) is from 110° to 180° C.

7. The process according to claim 6, wherein said organic free radical initiator is selected from the group consisting of organic peroxides, organic peroxy ketals, and azo compounds.

8. The process according to claim 7, wherein said organic free radical initiator is an azo compound selected from the group consisting of 2,2'-azo-bis-isobutyronitrile; and 2,2'-azo-bis-(2,4-dimethyl valeronitrile).

9. The process according to claim 7, wherein said organic free radical initiator is an organic peroxide selected from the group consisting of di-tert-butylperoxide; benzoyl peroxide; lauryl peroxide; oleyl peroxide; toluyl peroxide; di-tert-butyl diperphthalate; tert-butyl peracetate; tert-butyl perbenzoate; dicumyl peroxide; tert-butylperoxide isopropyl carbonate; 2,5-dimethyl-2,5-dimethyl-2,5 di-(tert-butylperoxy) hexane; 2,5-dimethyl-2,5-dimethyl-2,5 di-(tert-butylperoxy) hexane-3; cumene hydroperoxide; cyclopentane hydroperoxide; 2,5-dimethylhexane-2,5-dihydroperoxide; t-butyl hydroperoxide; and t-amyl hydroperoxide.

10. The process according to claim 7, wherein said organic free radical initiator is a peroxyketal selected from the group consisting of n-butyl-4,4-bis(t-butylperoxy) valerate; 1,1-di(tert-butylperoxy)-3,3,5-trimethyl cyclohexane; 1,1-di(tert-butylperoxy)cyclohexane; 2,2-di(tert-butylperoxy)cyclohexane; 1,1-di(t-amylperoxy) cyclohexane; 2,2-di(t-butylperoxy)butane; ethyl-3,3-di(tert-butylperoxy)butyrate; ethyl-3,3-di(tert-amylperoxy) butyrate; tert-butyl peroctate; and mixtures thereof.

11. The process according to claim 9, wherein said styrenic polymer is polystyrene.

12. The process according to claim 10 wherein said styrenic polymer is polystyrene.

13. The process according to claim 11, wherein in said polyphenylene ether $R_1$ and $R_2$ are both methyl radicals and said initiator is tert-butyl peracetate.

14. The process according to claim 13, wherein said polyphenylene ether is present in an amount up to 5 wt. %.

15. The process according to claim 12, wherein in said polyphenylene ether $R_1$ and $R_2$ are both methyl radicals and said initiator is selected from the group consisting of 1,1-di(t-amylperoxy)cyclohexane; 1,1di-(tert-butylperoxy) cyclohexane; ethyl-3,3-di(tert-butylperoxy)butyrate; ethyl-3,3-di(tert-amylperoxy)butyrate; and tert-butyl peroctate.

16. The process according to claim 15, wherein said initiator is 1,1di-(tert-butylperoxy)cyclohexane.

17. The process according to claim 15, wherein said polyphenylene ether is present in an amount up to 5 wt. %.

18. The process according to claim 16, wherein said polyphenylene ether is present in an amount up to 5 wt. %.

* * * * *